(12) United States Patent
Fujihara et al.

(10) Patent No.: US 12,223,635 B2
(45) Date of Patent: Feb. 11, 2025

(54) TEST SUPPORT METHOD, TEST SUPPORT DEVICE, AND STORAGE MEDIUM

(71) Applicant: Mitsubishi Electric Corporation, Tokyo (JP)

(72) Inventors: Maho Fujihara, Tokyo (JP); Daisuke Tateishi, Tokyo (JP); Hideo Nakata, Tokyo (JP); Shiho Adachi, Tokyo (JP); Keisuke Sugihara, Tokyo (JP); Shota Shimayoshi, Tokyo (JP); Atsushi Takami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 323 days.

(21) Appl. No.: 17/787,387

(22) PCT Filed: Jan. 29, 2020

(86) PCT No.: PCT/JP2020/003212
§ 371 (c)(1),
(2) Date: Jun. 20, 2022

(87) PCT Pub. No.: WO2021/152735
PCT Pub. Date: Aug. 5, 2021

(65) Prior Publication Data
US 2023/0015988 A1    Jan. 19, 2023

(51) Int. Cl.
*G06T 7/00* (2017.01)
*B61L 27/60* (2022.01)
(Continued)

(52) U.S. Cl.
CPC ............ *G06T 7/0004* (2013.01); *B61L 27/60* (2022.01); *G06V 10/44* (2022.01); *G06V 10/763* (2022.01);
(Continued)

(58) Field of Classification Search
CPC .......... Y02P 90/02; Y02P 90/80; Y02P 90/30; G05B 19/41875; G05B 23/0283;
(Continued)

(56) References Cited

U.S. PATENT DOCUMENTS

2010/0295923 A1    11/2010  Mihashi et al.
2020/0284082 A1    9/2020   Watanabe

FOREIGN PATENT DOCUMENTS

JP    H04257190 A     9/1992
JP    2005070210 A    3/2005
(Continued)

OTHER PUBLICATIONS

Machine Translation of JPH04257190A published unexamined patent application corresponding to Foreign Patent Document 1 on Jun. 20, 2022 IDS (Year: 1992).*
(Continued)

*Primary Examiner* — Xiao M Wu
*Assistant Examiner* — Scott E Sonners
(74) *Attorney, Agent, or Firm* — Buchanan Ingersoll & Rooney PC

(57) ABSTRACT

A test support method includes a step of obtaining a pre-change image and a post-change image to be displayed on a monitoring and control system, a step of extracting, from the post-change image, multiple symbols that have changed from corresponding symbols in the pre-change image, a step of adding order information to the multiple symbols extracted, and a step of outputting a test image in which the order information is added to the multiple symbols.

16 Claims, 10 Drawing Sheets

(51) Int. Cl.
  *G06V 10/44* (2022.01)
  *G06V 10/762* (2022.01)
  *G06V 10/764* (2022.01)
(52) U.S. Cl.
  CPC ........ *G06V 10/764* (2022.01); *G06T 2200/24* (2013.01); *G06T 2207/30121* (2013.01); *G06V 2201/02* (2022.01)
(58) Field of Classification Search
  CPC ............ G05B 19/4183; G05B 19/4185; G05B 23/0221; G05B 23/0264; G05B 19/4184; G05B 23/024; G05B 2219/35001; G05B 23/0208; G05B 19/0425; G05B 2219/33331; G05B 19/41885; G05B 19/406; G05B 2219/32014; G05B 23/027; G05B 23/0272; G05B 19/048; G06F 3/04847; G06F 3/04817; G06F 3/04842; G06F 3/0484; G06F 9/451; G06F 11/3409; G06F 11/0766; G06F 2221/034; G06F 11/324; Y04S 20/00; Y04S 40/20; Y04S 20/20; Y04S 20/221; Y04S 10/40; G06T 19/006; G06T 11/206; G06T 2200/24; G06T 7/0004; G06T 7/0002; G06T 2207/30164; G06T 11/00
  See application file for complete search history.

(56) References Cited

FOREIGN PATENT DOCUMENTS

| | | |
|---|---|---|
| JP | 2014056431 A | 3/2014 |
| JP | 2014133404 A | 7/2014 |
| JP | 2014142875 A | 8/2014 |
| JP | 2017033151 A | 2/2017 |
| JP | 2017037110 A | 2/2017 |
| JP | 2018124912 A | 8/2018 |
| JP | 2018167594 A | 11/2018 |
| WO | 2009093557 A1 | 7/2009 |

OTHER PUBLICATIONS

International Search Report (PCT/ISA/210) with translation and Written Opinion (PCT/ISA/237) mailed on Apr. 21, 2020, by the Japan Patent Office as the International Searching Authority for International Application No. PCT/JP2020/003212.

Office Action dated Oct. 28, 2022, issued in corresponding Indian Patent Application No. 2022-27042154, 7 pages.

First Office Action dated Dec. 26, 2023, issued in the corresponding Chinese Patent Application No. 202080093538.5, 13 pages including 6 pages of English Translation.

* cited by examiner

PRE-CHANGE IMAGE

POST-CHANGE IMAGE

TEST IMAGE (a)

LINE-OF-SIGHT MOVEMENT (b)

LINE-OF-SIGHT MOVEMENT

TEST SUPPORT METHOD, TEST SUPPORT DEVICE, AND STORAGE MEDIUM

FIELD

The present disclosure relates to a test support method, a test support device, and a test support program, each for a monitoring and control system such as a traffic control system and a power management system.

BACKGROUND

When, for example, a monitoring and control system, such as a traffic control system for efficient train operation in a railroad system, or a power management system for managing the operation of an electric power substation, is to be updated or newly constructed, a test needs to be performed in advance to verify satisfactory operation of the constructed system. This test is described in test items specified in a test procedure document or the like. The manufacturer of the monitoring and control system performs a test on the basis of this test procedure document, and submits a test report that provides test results to the client.

A typically wide variety of test items for such a monitoring and control system imposes a high burden on the testing person (hereinafter, tester). Thus, task reduction, time reduction, and cost reduction of the test work are demanded. Known as one means for reducing the burden of a test of a constructed monitoring and control system is a test support device that automates some processes of a test, such as reviewing the test procedures, adjustment of the screen display and of the position of the screen, and the like (see, e.g., Patent Literature 1).

CITATION LIST

Patent Literature

Patent Literature 1: Japanese Patent Application Laid-open No. 2014-142875

SUMMARY

Technical Problem

A conventional test support device requires the tester to visually check whether the display screen of the constructed monitoring and control system provides a correct display, and operates appropriately in response to a given signal, and the like. For example, in a case of verifying appropriate operation of the display screen, a single display screen may include a large number of symbols to be tested. The tester is required to extremely carefully check all the symbols needing checking, without overlooking, but, because of human errors, the tester can overlook a symbol needing checking.

The present disclosure has been made to solve the problems as those described above, and it is an object of the present disclosure to provide a test support method, a test support device, and a test support program that can each reduce or prevent overlooking by the tester, and reduce test burden, in testing of a monitoring and control system.

Solution to Problem

A test support method according to the present disclosure comprises: a step of obtaining a pre-change image and a post-change image, each to be displayed on a monitoring and control system; a step of extracting, from the post-change image, a plurality of symbols that have changed from corresponding symbols in the pre-change image; a step of adding order information to the plurality of the extracted symbols; and a step of outputting a test image in which the order information is added to the plurality of symbols.

A test support device according to the present disclosure comprises: an input unit to obtain a pre-change image and a post-change image, each to be displayed on a monitoring and control system; a processing unit to extract, from the post-change image, a plurality of symbols that have changed from corresponding symbols in the pre-change image, and to add order information to the extracted plurality of symbols; and an output unit to output a test image in which the order information is added to the plurality of symbols.

A test support program according to the present disclosure causes a computer to perform: a step of obtaining a pre-change image and a post-change image, each to be displayed on a monitoring and control system; a step of extracting, from the post-change image, a plurality of symbols that have changed from corresponding symbols in the pre-change image; a step of adding order information to the extracted plurality of symbols; and a step of outputting a test image in which the order information is added to the plurality of symbols.

Advantageous Effects of Invention

According to the present disclosure, a test image in which order information is added to symbols in an image after a change (hereinafter, post-change image), which have changed from corresponding symbols in an image before the change (hereinafter, pre-change image) is output. This enables the tester to check symbols needing checking, which have changed from corresponding symbols in the screen before the change, on the basis of the order information added to the symbols. As a result, the tester can thoroughly check the symbols needing checking. Thus, test burden and overlooking of a symbol can be reduced.

DESCRIPTION OF EMBODIMENTS

First Embodiment

<Configuration of Test Support System 100>

Figure 1:
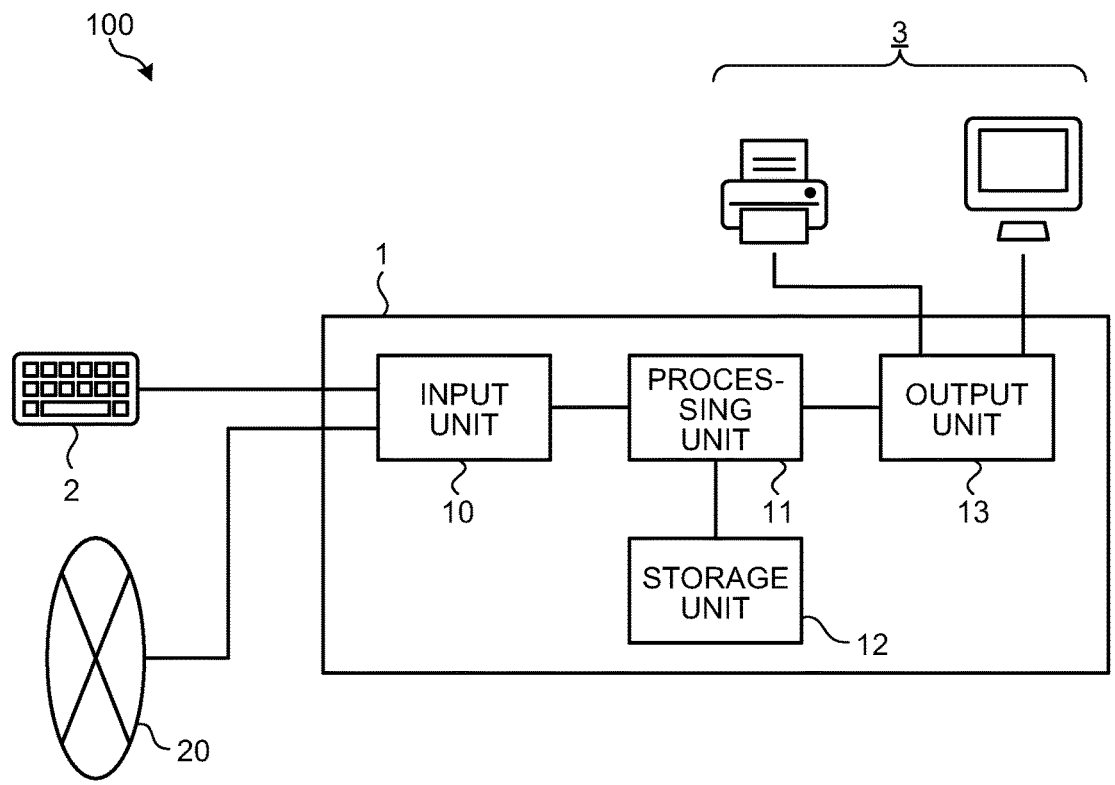
FIG. 1 is a schematic diagram of a test support system according to a first embodiment.

A configuration of a test support system 100 according to a first embodiment will be described with reference to FIG. 1. FIG. 1 illustrates a schematic diagram of the test support system 100 for supporting a test of a constructed monitoring and control system. The test support system 100 includes a test support device 1, an input device 2, and an output device 3. In addition, the test support system 100 is connected to a network 20 such as, for example, an in-house local area network (LAN) for communication therewith.

The test support device 1 is, for example, a computer installed in an office of the manufacturer that has constructed the monitoring and control system. The test support device 1 generates a test image to be viewed by the tester in performing a test of a monitoring and control system such as a traffic control system or a power management system. The present embodiment is based on the assumption that the test support device 1 is installed in an office, but the place of installation of the test support device 1 is not limited thereto. The test support device 1 may be installed in a server outside the premises or installed in a cloud.

The input device 2 is a device for inputting an operator's command or data to the test support device 1. Examples of the device for inputting an operator's command include a keyboard, a mouse, and a touch panel. In addition, examples of the device for inputting data include a hard disk drive (HDD), a solid state drive (SSD), an SD card, and a USB memory.

The output device 3 is a device for displaying or printing information output from the test support device 1. Examples of the device for displaying information include a liquid crystal display, a plasma display, an organic electroluminescent (EL) display, a smartphone, and a mobile tablet device. In addition, examples of the device for printing information include a printer.

A configuration of the test support device 1 will next be described in detail. As illustrated in FIG. 1, the test support device 1 includes an input unit 10, a processing unit 11, a storage unit 12, and an output unit 13.

The input unit 10 is an input interface for receiving an operator's command and/or data from outside the test support device 1. Examples of the input interface for receiving an operator's command include a USB terminal. The input unit 10 is connected to the input device 2 via a USB cable to receive an operator's command from the input device 2. In addition, examples of the input interface for receiving data include a LAN terminal. The input unit 10 is not limited to a LAN terminal, which is a wired network terminal, but may perform wireless communication using, for example, a wireless LAN scheme. In addition, the communication medium is not limited to a LAN, but data may be received via a network such as the Internet.

The processing unit 11, which is a processor such as a central processing unit (CPU), is connected to the input unit 10, the storage unit 12, and the output unit 13. The processing unit 11 executes a test support program installed in the storage unit 12 to control operations of the input unit 10, of the storage unit 12, and of the output unit 13, and to perform computation processing and the like.

The processing unit 11 receives and processes data. The output unit 13 is an output interface for outputting a processing result provided by the processing unit 11, and the like to outside the test support device 1. Examples of the output interface include a high-definition multimedia interface (HDMI) terminal (HDMI is a registered trademark), a digital visual interface (DVI) terminal, a D-sub terminal, and a USB terminal. The output unit 13 is connected to the output device 3 via one of various types of cables, and the processing unit 11 transmits various data to the output device 3 via the output unit 13. This enables the output device 3 to display or print the data received.

<Test Image Generation Process of Test Support Device 1>

Figure 2:
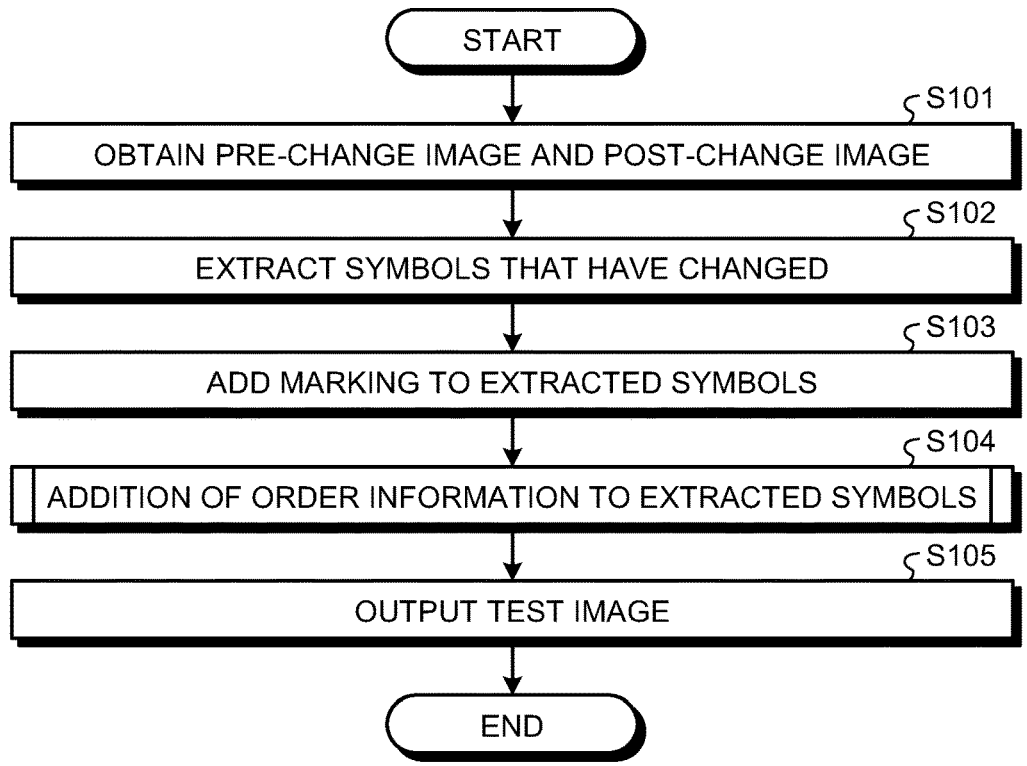
FIG. 2 is a flowchart of a test image generation process performed by the test support device according to the first embodiment.

A test image generation process of the test support device 1 will next be described with reference to FIG. 2. FIG. 2 illustrates a flowchart of a test image generation process performed by the test support device 1.

At step S101, the test support device 1 obtains a pre-change image and a post-change image as the images to be tested and displayed in the monitoring and control system. In this respect, the monitoring and control system is tested by a tester to check whether a symbol on an image displayed by the monitoring and control system changes as expected in response to input of a signal. The term "pre-change image" refers to an image displayed by the monitoring and control system before a signal is input, and the term "post-change image" refers to an image after the display has changed in response to the input of the signal.

Figure 3:
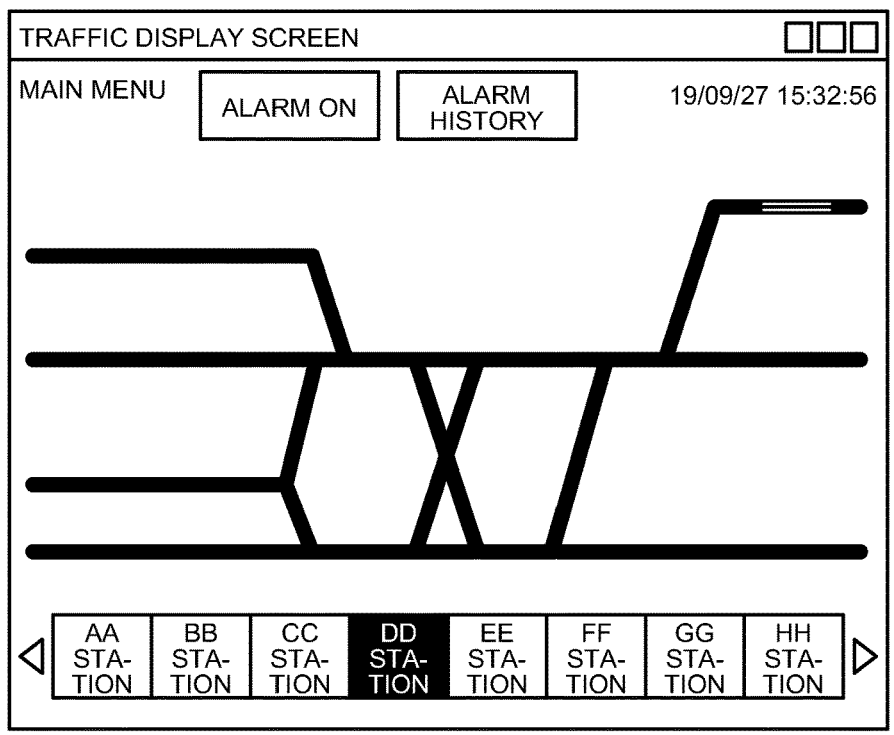
FIG. 3 is a schematic view of a pre-change image obtained by the test support device according to the first embodiment.

An example of the pre-change image will next be described with reference to FIG. 3. FIG. 3 illustrates, by way of example, a schematic view of a pre-change image on a traffic display screen displayed by a traffic control system. A traffic control system is a system for centrally monitoring and controlling train operation, and the traffic display screen displays, for example, traffic information, various types of anomalous conditions, and the like of trains on a railroad track. Note that the following description will be provided, by way of example, with respect to a case in which the test support device supports a traffic control system.

Figure 4:
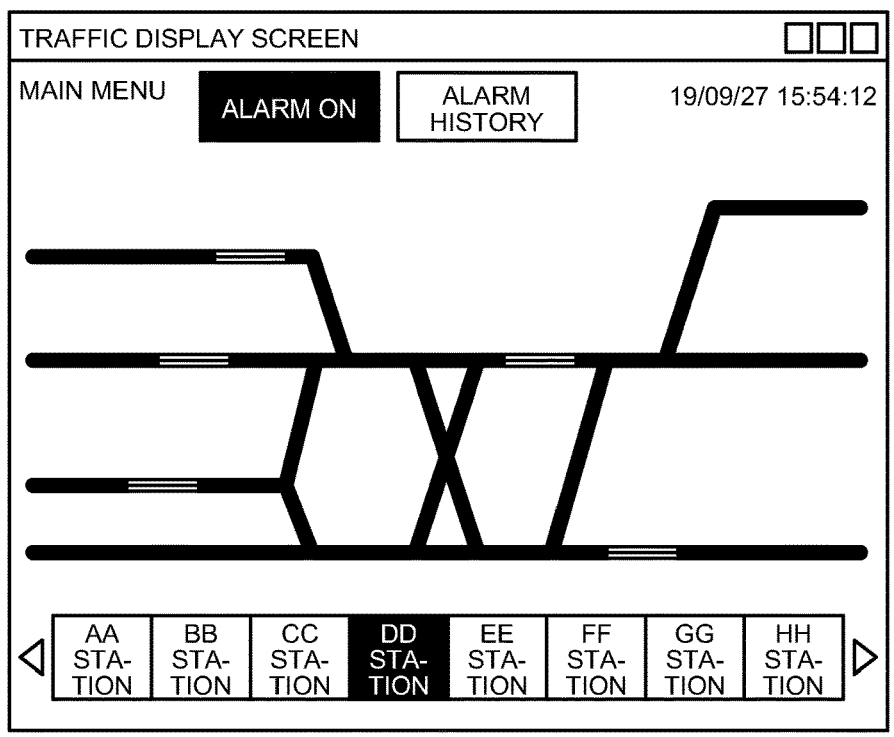
FIG. 4 is a schematic view of a post-change image obtained by the test support device according to the first embodiment.

An example of the post-change image will next be described with reference to FIG. 4. FIG. 4 illustrates a schematic view of a post-change image in the traffic display screen displayed by the traffic control system. To check whether the constructed traffic control system displays an appropriate image in various situations during monitoring and controlling, a signal simulating a signal that will be generated in each situation during the monitoring and controlling is input to the traffic control system for a test item corresponding to that situation. The traffic control system changes the display in the monitoring and control system from a pre-change image to a post-change image on the basis of the signal that has been input.

Prior to performing a test, the tester of the traffic control system generates multiple simulation signals corresponding to the test items of the test to be performed, and inputs these simulation signals to the traffic control system. In this work, the tester captures, using a screenshot function, a camera, or the like, a pre-change image and a post-change image that has changed in response to input of each corresponding one of the multiple simulation signals, and generates data on a test image set including the pre-change images and the post-change images corresponding to the test items. The generated data on the test image set is stored in a server on an office LAN, a USB memory, or the like. The test support device 1 obtains, at step S101, the data on the test image set including the pre-change images and the post-change images generated in advance, from the server, the USB memory, or the like via the input unit 10. The obtained data on the test image set is stored in the storage unit 12 of the test support device 1.

Returning to FIG. 2, the test support device 1 extracts, at step S102, symbols that have changed between the obtained pre-change and post-change images. The test support device 1 detects an image difference between the pre-change image and the post-change image to identify symbols in the post-change image, which have changed from the corresponding symbols in the pre-change image. A symbol in the post-change image, which has changed from the corresponding symbol in the pre-change image is referred to hereinafter as "changed symbol" as appropriate.

Figure 5:
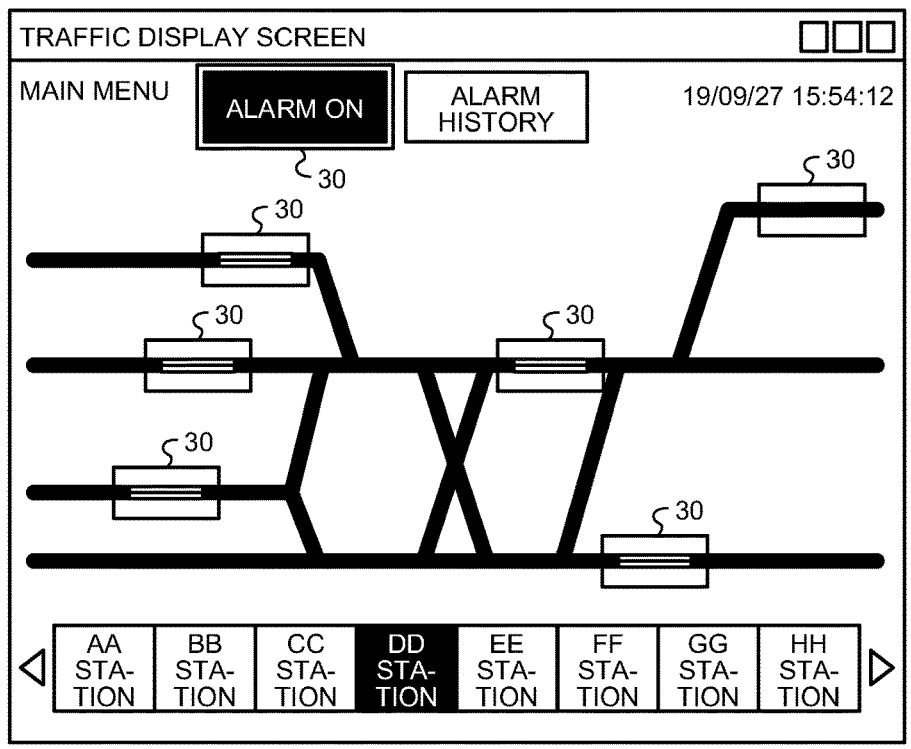
FIG. 5 is a schematic view of a post-change image with markings added by the test support device according to the first embodiment.

Next, at step S103, the test support device 1 adds a marking 30 to the changed symbol. FIG. 5 illustrates a schematic view of a post-change image provided with markings 30. As illustrated in FIG. 5, the test support device 1 adds a rectangular box to each of the changed symbols identified at step S102. As a result, a symbol in the post-change image, which has changed from the corresponding symbol in the pre-change image, is placed in a rectangular box, which clearly shows the tester the position of a symbol that needs checking. This reduces labor and time for seeking a symbol that needs checking, thereby reducing the test burden. Note that the form of the marking 30 added to a changed symbol is not limited to a rectangular box, but can be any form that shows the position of that symbol to the tester. For example, the marking 30 may be a circular frame, underline the symbol, change the color of the symbol, or the like. Note also that despite different dates and times displayed at the top right corners of the images, i.e., the pre-change image and the post-change image, no marking 30 has been added. A region where no detection of a change is required such as the date and time field may be specified in advance to be set as a region where detection of a change is to be masked.

Returning again to FIG. 2, the test support device 1 adds, at step S104, order information to the symbols that have changed. The test support device 1 assigns, for example, sequential numbers different from one another such as 1, 2, 3, . . . to the symbols in the post-change image, which have changed from the corresponding symbols in the pre-change image. This creates a test image including the changed symbols having the order information added thereto. Note that the order information is not limited to numbers, but may be, for example, letters of the alphabet in alphabetical order of A, B, C . . . . At step S105, the test support device 1 outputs the created test image to the output device 3 via the output unit 13.

<Order Information Addition Process of Test Support Device 1>

Figure 6:
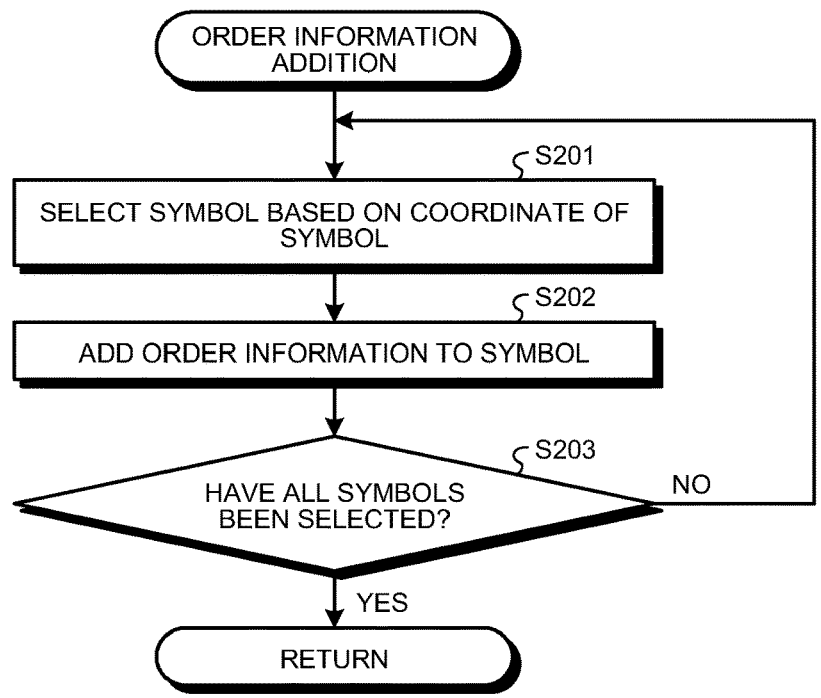
FIG. 6 is a flowchart of an order information addition process performed by the test support device according to the first embodiment.

An order information addition process performed by the test support device 1 will next be described with reference to FIGS. 6 and 7. FIG. 6 illustrates a flowchart of an order information addition process performed by the test support device 1.

At step S201, the test support device 1 selects a changed symbol included in the post-change image, on the basis of a coordinate of the symbol. Specifically, the test support device 1 selects the symbol positioned at the smallest x coordinate, from the unselected changed symbol(s). When two or more symbols have the same x coordinate, one having a smaller y coordinate is preferentially selected. Next, at step S202, the test support device 1 adds order information to the changed symbol selected, in a sequential manner. In this operation, the coordinate of a symbol is a representative coordinate of the pixels included in the symbol image. There is no particular limitation on the representative coordinate, and examples thereof include the center position of the symbol image, and the center position of the order information added to the symbol.

At step S203, the test support device 1 determines whether all the multiple changed symbols extracted at step S102 have been selected. If all the symbols have not yet been selected (NO at S203), the symbol having the smallest x coordinate is selected from the unselected changed symbol(s) excluding the symbols that have already been selected. If all the symbols have been selected (YES at S204), the order information addition process for the changed symbols is terminated, and the process proceeds to S105 of FIG. 2. As a result of adding the pieces of order information to the extracted changed symbols in the manner as discussed above, the pieces of order information added to the multiple changed symbols are arranged in one direction in a sequential order.

Figure 7:
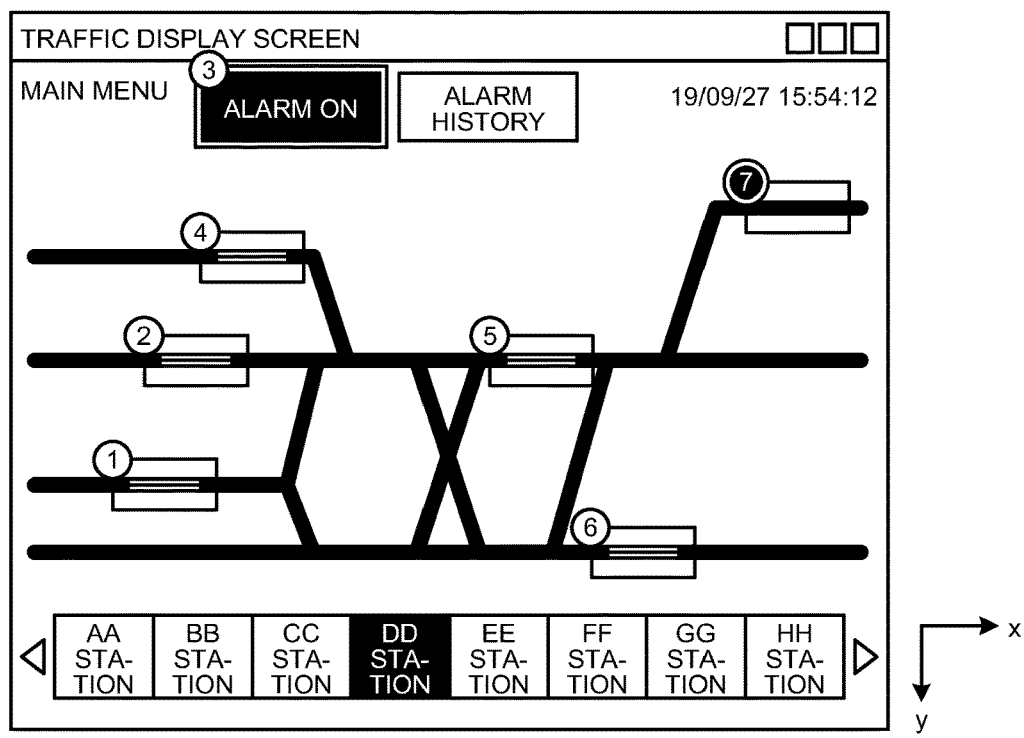
FIG. 7 is a schematic view of a test image output by the test support device according to the first embodiment.

FIG. 7 illustrates a schematic view of a test image generated by the order information addition process according to the present embodiment. The test image illustrated in FIG. 7 illustrates each pixel using an x-coordinate axis extending in the right direction and a y-coordinate axis extending in the downward direction both from the origin at the topmost and leftmost pixel of the pixels included in the test image. As illustrated in FIG. 7, the order information is assigned to the multiple changed symbols in ascending order of x coordinate in the embodiment, thereby causing the numerals to be sequentially displayed from left to right in the image.

Of the pieces of order information added to the multiple changed symbols, the last piece of order information is preferably displayed differently from the other pieces of order information. Specifically, the number "7" is the last number in the example of the present embodiment, and accordingly, the order information added to the other symbols is displayed with a black text on the white background, but the order information denoted by the last number "7" is displayed with a white text on the black background. This enables the tester to understand at a glance that the number "7" is the last number, and easily understand that the number of symbols requiring checking on the test screen is 7. This enables overlooking of a symbol by the tester to be more effectively reduced or prevented.

The order information is added to the multiple changed symbols in ascending order of x coordinate in the present embodiment, but may be added thereto in another order. For example, the order information may be added in descending order of x coordinate or in ascending or descending order of y coordinate. In any of these cases, the pieces of order information added to the extracted multiple changed symbols can be arranged in one direction in sequential order.

According to the configuration of the present embodiment, a test image in which order information is added to the symbols in the post-change image, which have changed from the corresponding symbols in the pre-change image is output. This enables the tester to thoroughly check the symbols that need checking, by checking, on the basis of the order information added to those symbols, the symbols that need checking and have changed from the corresponding symbols in the pre-change screen. Thus, test burden and overlooking, of a symbol can be reduced.

Second Embodiment

<Order Information Addition Process of Test Support Device 1>

An order information addition process of the test support device 1 according to a second embodiment will next be described with reference to FIGS. 8 and 9. In this respect, unlike the order information addition process in the first embodiment that adds pieces of order information such that the added pieces of order information are arranged in one direction in a sequential order, the order information addition process in the second embodiment divides the post-change image into multiple zones, and adds order information to symbols in each zone (hereinafter, division zones) resulting from the division of the post-change image. The configuration and processes other than the order information addition process performed by the test support device 1 are similar to those in the first embodiment.

Figure 8:
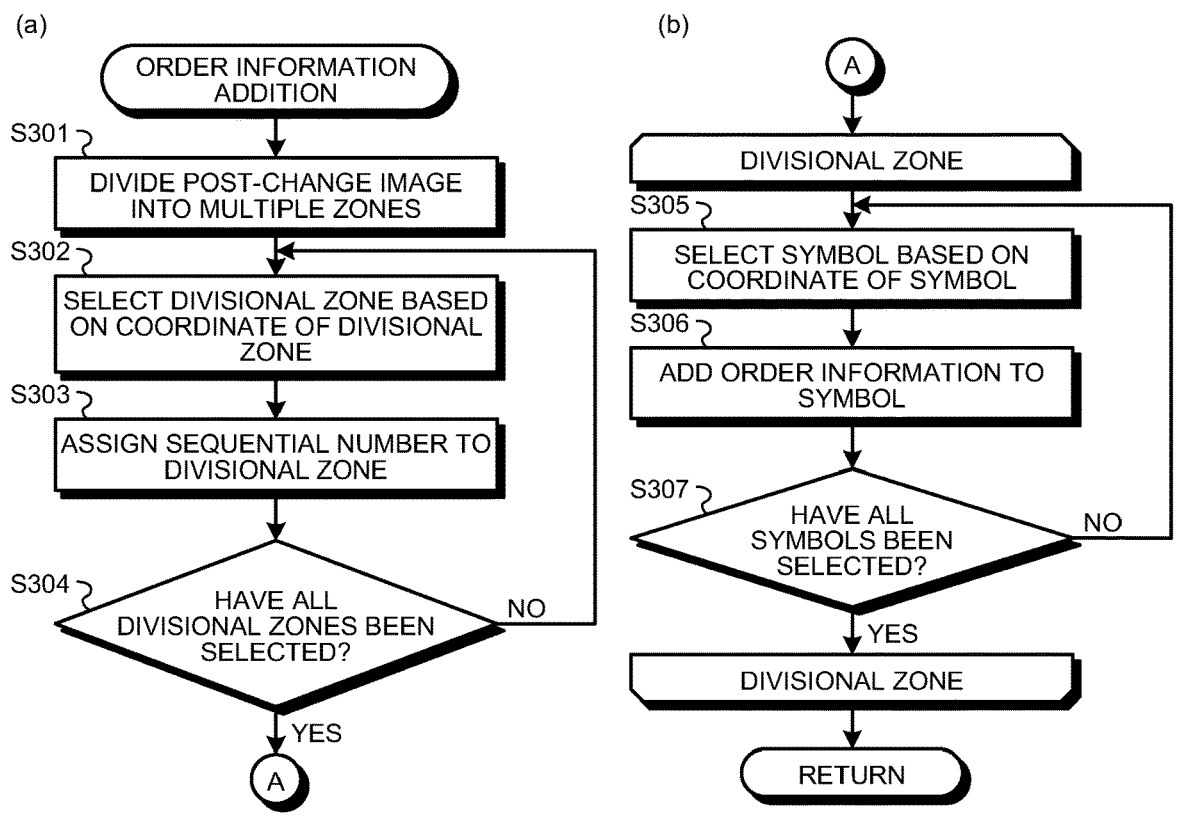
FIG. 8 is a flowchart of an order information addition process performed by the test support device according to a second embodiment.

FIG. 8 illustrates a flowchart of the order information addition process performed by the test support device 1. At step S301, the test support device 1 divides the post-change image into multiple zones. Specifically, the test support device 1 equally divides the post-change image into fifths, i.e., five zones, along the y-axis direction. Note that the number of zones to be generated by dividing the post-change image is determined depending on the number of the changed symbols extracted at step S102. Presence of a high number of changed symbols requires the tester to check carefully in every portion of the screen, in which case the number of the division zones is set to a larger number accordingly.

The method of dividing the post-change image is not limited to the above method, and the post-change image may be divided into multiple zones along the x-axis direction or bidirectionally along the x-axis and y-axis directions. In addition, the division may be made to provide the divisional zones having different sizes rather than the same size. Moreover, the number of the divisional zones of the post-change image may be fixed, or the number of the divisional zones may be specified by the tester, and the post-change image may then be divided on the basis of that number.

Next, at step S302, the test support device 1 selects a division zone on the basis of a coordinate of the divisional zone. Specifically, the test support device 1 selects the divisional zone positioned at the smallest y coordinate, among the unselected divisional zone(s). Next, at step S303, the test support device 1 assigns a sequential number to the selected divisional zone, in a sequential manner. The coordinate of a divisional zone is a representative coordinate of that divisional zone. There is no particular limitation on the representative coordinate, and examples thereof include the center position of the divisional zone, and an end point position of the divisional zone.

At step S304, the test support device 1 determines whether all the multiple divisional zones resulting from the division of the post-change image at step S301 have been selected. If all the divisional zones have not yet been selected (NO at S304), the test support device 1 selects, in a sequential manner, the divisional zone having the smallest y coordinate from the unselected divisional zone(s) excluding the divisional zones that have already been selected, and assigns a sequential number to the selected divisional zone. If all the divisional zones have been selected (YES at S304), the process of assigning sequential numbers to the divisional zones is terminated, and the process proceeds to the flowchart of FIG. 8(b). Note that as a result of assigning the sequential numbers to the divisional zones in the manner as described above, the sequential numbers assigned to the divisional zones are provided in one direction in a sequential order. In the present embodiment, such assignment of sequential numbers in ascending order of y coordinate causes the sequential numbers to be sequentially assigned to the multiple divisional zones starting from the zone positioned at the top on the screen.

Dividing the post-change image into multiple zones causes the multiple changed symbols extracted at step S102 to be grouped into multiple groups in correspondence to the zones. Specifically, symbols that belongs to the first zone of the multiple divisional zones are assigned to the first group, symbols that belong to the second zone are assigned to the second group, symbols that belong to the third zone are assigned to the third group, symbols that belong to the fourth zone are assigned to the fourth group, and symbols that belong to the fifth zone are assigned to the fifth group. The extracted multiple changed symbols are thus grouped into the five groups.

Next, the process proceeds to the flowchart of FIG. 8(b), and the test support device 1 adds order information to the changed symbols in each of the groups included in the divisional zones in accordance with the sequential numbers assigned to the divisional zones. At step S305, the test support device 1 selects a changed symbol in the first group included in the first zone of the multiple divisional zones, on the basis of the coordinate of the symbol. Specifically, the test support device 1 selects the symbol positioned at the smallest x coordinate, from the unselected changed symbol(s) belonging to the first group. Next, at step S306, the test support device 1 adds order information to the selected changed symbol in a sequential manner.

In the present embodiment, the post-change image is divided along the y-axis, and the operation of addition of the order information to changed symbols is performed along the x-axis. As described above, the operation of addition of the order information to changed symbols is preferably performed in a direction perpendicular to the direction of division of the post-change image. Dividing the post-change image along the y-axis direction results in the divisional zones each having a long shape along the x-axis direction. Thus, performing the operation of addition of the order information to changed symbols in the x-axis direction can improve visual recognizability of the tester.

At step S307, the test support device 1 determines whether all the multiple changed symbols included in that divisional zone have been selected. If all the symbols that belong to the first group have not yet been selected (NO at S307), the symbol having the smallest x coordinate is selected from the unselected changed symbol(s) excluding the symbols that have already been selected. If all the symbols classified as the first group have been selected (YES at S307), the order information addition process for the changed symbols in the first group included in the first zone is terminated, and the order information addition process for the changed symbols in the second group included in the second zone is then performed. The set of operations from step S305 to step S307 is repeated until the order information addition process is completed for all the divisional zones, thereby performing the order information addition process on all the divisional zones in order of the sequential numbers of the divisional zones assigned at step S303. The order information is thus added to the changed symbols included in all the divisional zones.

As a result of dividing the changed image into multiple zones and adding the pieces of order information to the changed symbols on a per-divisional zone basis in the manner as described above, the pieces of order information added to the multiple changed symbols included in each of the divisional zones are arranged in one direction in a sequential order.

Figure 9:
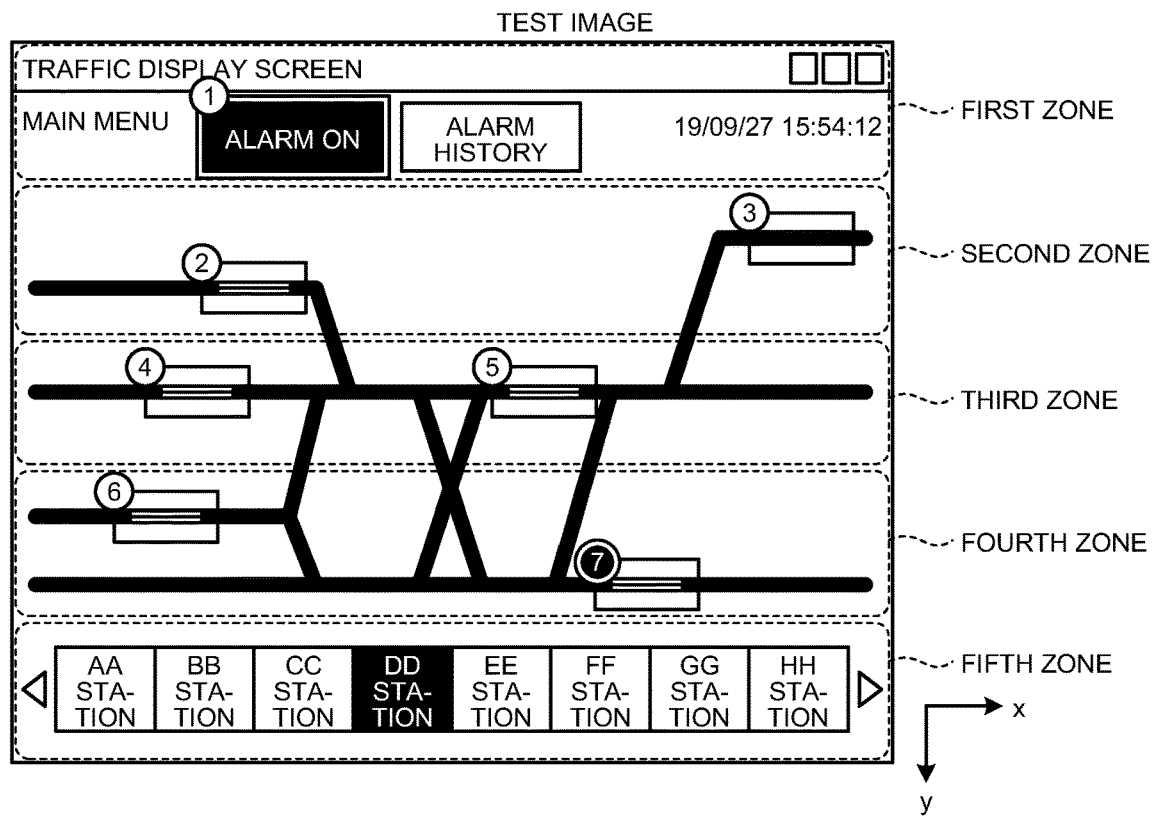
FIG. 9 is a schematic view of a test image output by the test support device according to the second embodiment.

FIG. 9 illustrates a schematic view of a test image generated by the order information addition process according to the present embodiment. For clarity of illustration of the process in the present embodiment, the test image illustrated in FIG. 9 indicates that the five zones generated by dividing at step S301 are shown in broken lines. However, no broken lines indicating the division zones are displayed in the practical test image. As illustrated in FIG. 9, numerals are sequentially displayed on multiple changed symbols from left to right in the image for each divisional zone in the present embodiment.

The present embodiment has been described as adding the order information to the multiple changed symbols included in each of the divisional zones in ascending order of x coordinate, but the order information may be added to the symbols in another order. For example, similarly to the first embodiment, the order information may be added in descending order of x coordinate or in ascending or descending order of y coordinate. In any of these cases, as a result of adding the pieces of order information to the extracted multiple changed symbols such that the pieces of order information in each divisional zone are arranged in one direction in a sequential order, the added pieces of order information are arranged in a zigzag in a vertical or horizontal direction.

According to the configuration of the present embodiment, a test image in which order information is sequentially added, on a per-divisional zone basis, to the symbols in the post-change image, that have changed from the corresponding symbols in the pre-change image is output. This can reduce eye movement needed for checking symbols particularly even when the tester is required to check carefully every portion of the test screen in the presence of a high number of changed symbols. This enables the tester to check symbols that need checking and have changed from the corresponding symbols in the pre-change screen, on the basis of the order information added to those symbols, thereby reducing test burden and overlooking, of a symbol.

Third Embodiment

<Order Information Addition Process of Test Support Device 1>

An order information addition process of the test support device 1 according to a third embodiment will next be described with reference to FIGS. 10 and 11. In this respect, unlike the order information addition process in the first embodiment that adds pieces of order information such that the added pieces of order information are arranged in one direction in a sequential order, the order information addition process in the third embodiment divides the changed symbols extracted at step S102 into multiple groups through a clustering method, and adds the order information to symbols in each group resulting from the division of the changed symbols. The configuration and processes other than the order information addition process performed by the test support device 1 are similar to those in the first and second embodiments.

Figure 10:
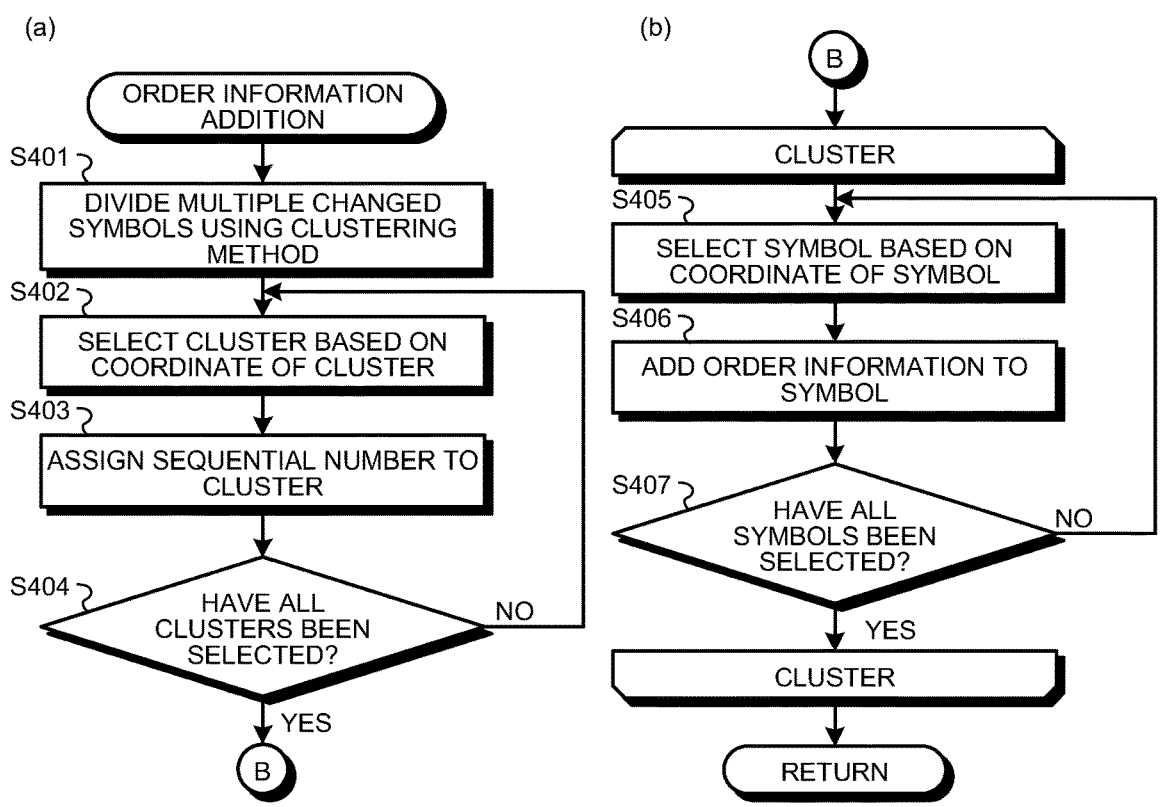
FIG. 10 is a flowchart of an order information addition process performed by the test support device according to a third embodiment.

FIG. 10 illustrates a flowchart of an order information addition process performed by the test support device 1. At step S401, the test support device 1 divides the multiple changed symbols extracted at step S102, into multiple clusters. Specifically, using a publicly known clustering method, the test support device 1 performs clustering on the basis of reference points of the respective multiple changed symbols. The reference point of a changed symbol may be, for example but not limited to, the center coordinate of that symbol. In addition, the clustering method may be, for example, mean-shift clustering or k-means clustering. In this respect, mean-shift clustering is preferred because of unnecessity for specifying the number of clusters to be used in division of changed symbols, which in turn enables division of the changed symbols into as many clusters as is suitable for the number, or the distribution, of the changed symbols.

Next, at step S402, the test support device 1 selects one of the clusters resulting from the division of the changed symbols, on the basis of a coordinate of the cluster. Specifically, the test support device 1 selects the cluster positioned at the smallest x coordinate, among the unselected cluster(s). Next, at step S403, the test support device 1 assigns a sequential number to the selected cluster, in a sequential manner. The coordinate of a cluster is a representative coordinate of that cluster. There is no particular limitation on the representative coordinate, and examples thereof include the center-of-gravity position of the cluster, and a coordinate of a symbol positioned at an edge inside the cluster.

At step S404, the test support device 1 determines whether all the multiple clusters resulting from the division of the changed symbols at step S401 have been selected. If all the clusters have not yet been selected (NO at S404), the test support device 1 selects, in a sequential manner, the cluster having the smallest y coordinate from the unselected cluster(s) excluding the clusters that have already been selected, and assigns a sequential number to the selected cluster. If all the clusters have been selected (YES at S404), the process of assigning sequential numbers to the clusters is terminated, and the process proceeds to the flowchart of FIG. 10(b). Note that as a result of assigning sequential numbers to the clusters, the sequential numbers assigned to the multiple clusters are provided in one direction in a sequential order. In the present embodiment, assignment of sequential numbers in ascending order of x coordinate causes the sequential numbers to be sequentially assigned to the multiple divisional zones starting from the cluster positioned at the left of the screen.

Clustering the multiple changed symbols extracted at step S102 assigns the changed symbols to multiple groups. Specifically, symbols that belong to the first cluster of the multiple clusters are assigned to the first group, symbols that belong to the second cluster are assigned to the second group, and symbols that belong to the third cluster are assigned to the third group. The extracted multiple changed symbols are thus divided into the three groups.

Next, the process proceeds to the flowchart of FIG. 10(b), and the test support device 1 adds order information to the changed symbols in each of the groups included in the clusters in accordance with the sequential numbers assigned to the clusters. At step S405, the test support device 1 selects a changed symbol in the first group included in the first cluster of the multiple clusters, on the basis of the coordinate of the symbol. Specifically, the test support device 1 selects the symbol positioned at the smallest y coordinate, from the unselected changed symbol(s) belonging to the first group. Next, at step S406, the test support device 1 adds order information to the selected changed symbol in a sequential manner.

At step S407, the test support device 1 determines whether all the multiple changed symbols included in that cluster have been selected. If all the symbols belonging to the first group have not yet been selected (NO at S407), the symbol having the smallest y coordinate is selected from the unselected changed symbol(s) excluding the symbols that have already been selected. If all the symbols belonging to the first group have been selected (YES at S407), the order information addition process for the changed symbols in the first group included in the first cluster is terminated, and the order information addition process for the changed symbols in the second group included in the second cluster is then performed. The set of operations from step S405 to step S407 is repeated until the order information addition process is completed for all the clusters, thereby performing the order information addition process on all the clusters in order of the sequential numbers of the clusters assigned at step S403. The order information is thus added to the changed symbols included in all the clusters.

As a result of dividing the extracted changed symbols into multiple clusters and adding the pieces of order information to the changed symbols on a per-cluster basis in the manner as described above, the pieces of order information added to the multiple changed symbols included in each of the clusters are arranged in one direction in a sequential order.

Figure 11:
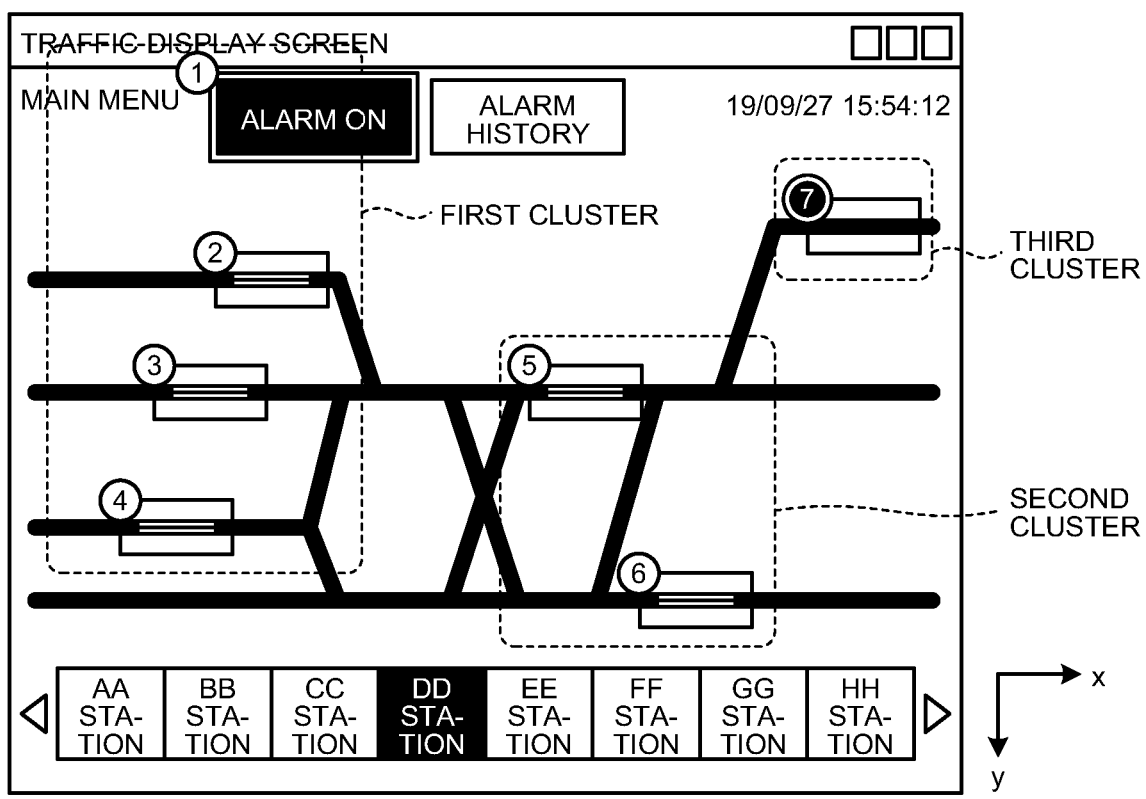
FIG. 11 is a schematic view of a test image output by the test support device according to the third embodiment.

FIG. 11 illustrates a schematic view of a test image generated by the order information addition process according to the present embodiment. For clarity of illustration of the process in the present embodiment, the test image illustrated in FIG. 11 indicates that the three clusters generated by clustering at step S401 are shown in broken lines. However, no broken lines indicating the clusters generated by clustering are displayed in the practical test image. As illustrated in FIG. 11, numerals are sequentially displayed on the multiple changed symbols from top to bottom in the image for each cluster in the present embodiment.

The present embodiment has been described as adding the order information to the multiple changed symbols included in each of the clusters in ascending order of y coordinate, but the order information may be added to the symbols in another order. For example, similarly to the first and second embodiments, the order information may be added in descending order of y coordinate or in ascending or descending order of x coordinate. In any of these cases, as a result of adding the pieces of order information to the extracted multiple changed symbols such that the pieces of order information in each cluster are arranged in one direction in a sequential order, the added pieces of order information are grouped together on a per-cluster basis.

According to the configuration of the present embodiment, a test image in which order information is sequentially added to the symbols in the post-change image, that have changed from the corresponding symbols in the pre-change image, on a per-cluster basis is output. This can reduce eye movement needed for checking symbols particularly even when the distribution of the changed symbols in the test screen is non-uniform, that is, even when these changed symbols are centered on multiple locations. This enables the tester to check symbols that need checking and have changed from the corresponding symbols in the pre-change screen, on the basis of the order information added to those symbols, thereby reducing enabling test burden and overlooking, of a symbol.

Fourth Embodiment

<Order Information Addition Process of Test Support Device 1>

An order information addition process of the test support device 1 according to a fourth embodiment will next be described with reference to FIGS. 12 and 13. In this respect, the order information addition processes in the first, second, and third embodiments add order information to the changed symbols using respective different fixed approaches, which are addition of order information in one direction in a sequential order, addition of order information using an image zone dividing approach, and addition of order information using a clustering method. In contrast, the test support device 1 of the fourth embodiment differs in automatically selecting a suitable order information addition approach on the basis of obtained pre-change and a post-change images, and adding order information to the changed symbols in a dynamic manner. The configuration and processes other than the order information addition process performed by the test support device 1 are similar to those in the first, second, and third embodiments.

Figure 12:
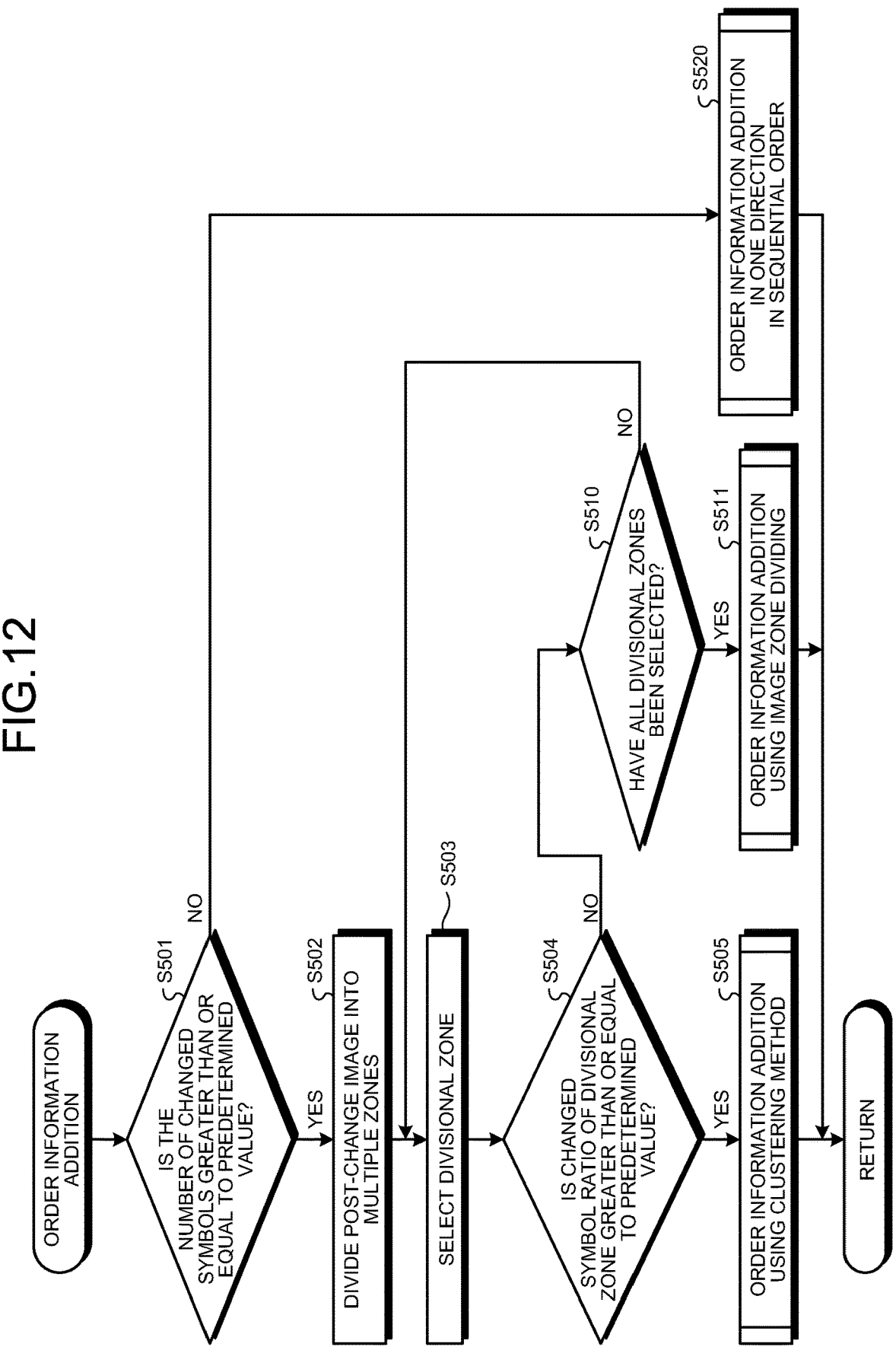
FIG. 12 is a flowchart of an order information addition process performed by the test support device according to a fourth embodiment.

FIG. 12 illustrates a flowchart of an order information addition process performed by the test support device 1. At step S501, the test support device 1 obtains information about the number of changed symbols extracted at step S102, and determines whether the number of changed symbols included in the post-change image is greater than or equal to a predetermined value. In this regard, the predetermined value can be, for example but not limited to, "3", but may be set to a value ranging from 1 to 5 as appropriate.

If the number of extracted changed symbols is less than the predetermined value (NO at S501), the test support device 1 adds order information to the changed symbols at step S520 using the method of adding order information in one direction in a sequential order described in the first embodiment. When the number of changed symbols on the test screen is less than the predetermined number, use of any one of the approaches of adding order information will results in a small variation in distance of movement of the tester's line-of-sight. For this reason, the approach of adding order information in one direction in a sequential order is used to thereby perform an easy and convenient addition of order information.

Alternatively, if the number of changed symbols extracted is greater than or equal to the predetermined value (YES at S501), the test support device 1 divides, at step S502, the post-change image into multiple zones. Specifically, the test support device 1 divides the post-change image equally into four parts along the x-axis direction and equally into three parts along the y-axis direction, that is, divides the post-change image into 12 zones in total. The number of zones to be generated by dividing the post-change image is not limited to twelve, and may be set as appropriate on the basis of the size of the screen of the monitoring and control system to be tested, on the size of the changed symbols, on or the like.

Next, at step S503, the test support device 1 selects a division zone in a sequential manner. There is no particular limitation on the order of selection. The division zones can be sequentially selected starting from the top left portion along the x-axis or the y-axis. At step S504, the test support device 1 obtains the number of the changed symbols included in the selected divisional zone, and calculates the ratio of the changed symbols (hereinafter, changed symbol ratio) in the selected divisional zone.

Figure 13:
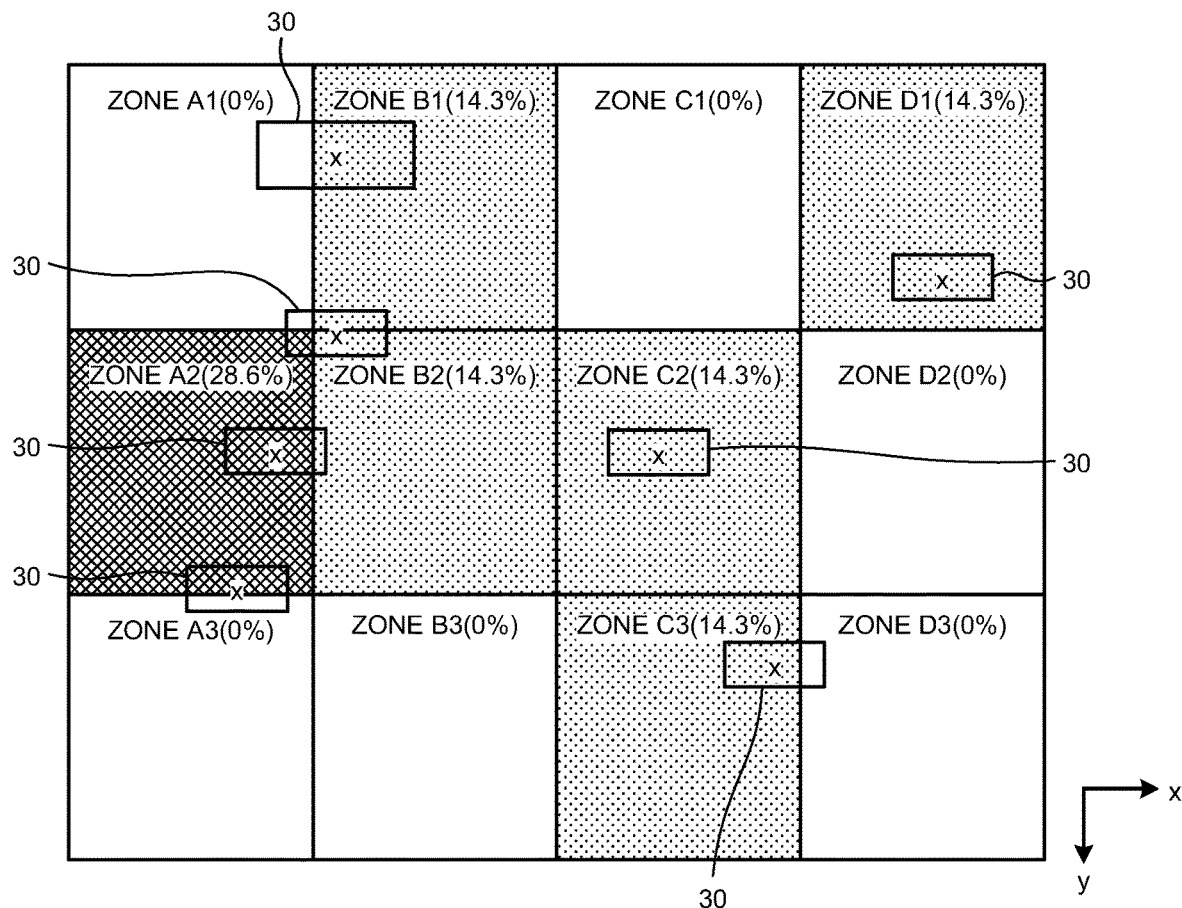
FIG. 13 is a diagram illustrating the ratio of changed symbols in each of divisional zones in the fourth embodiment.

FIG. 13 is a diagram illustrating the ratio of the changed symbols in each of the divisional zones. As illustrated in FIG. 13, when zone A1 is selected at step S503, zone A1 includes none of the markings 30 of the changed symbols extracted at step S103. In this example, this post-change image includes seven changed symbols in total, which derives the changed symbol ratio of 0/7, i.e., 0%, in zone A1. Similarly to A1, zone C1, zone D2, zones A3 and B3, and zone D3 include none of the markings 30 of the changed symbols, which also derive the changed symbol ratios of about 0%.

In addition, when zone B1 is selected at step S503, zone B1 includes one of the markings 30 of the changed symbols, which derives the changed symbol ratio of 1/7, i.e., about 14.3%, in zone B1. Zone D1, zone B2, zone C2, and zone C3 also each include one of the markings 30 of the changed symbols, which also derives the changed symbol ratio of about 14.3%.

Moreover, when zone A2 is selected at step S503, zone A2 includes two of the markings 30 of the changed symbols, which derives the changed symbol ratio of 2/7, i.e., about 28.6%, in zone A2.

At step S504, the test support device 1 calculates the changed symbol ratio of the selected zone in this manner, and then determines whether the changed symbol ratio is greater than or equal to a predetermined value. In this respect, the predetermined value can be, for example but not limited to, "30%", but may be set to a value ranging from 10% to 50% as appropriate.

If the ratio of the changed symbols extracted is less than the predetermined value (NO at S504), the test support device 1 determines, at step S510, whether all the multiple divisional zones resulting from the division of the post-change image at step 502 have been selected. If all the divisional zones have not yet been selected (NO at S510), the test support device 1 selects an unselected divisional zone other than the divisional zones that have already been selected, in a sequential manner, and then determines whether the changed symbol ratio of the divisional zone selected is greater than or equal to the predetermined value.

If none of the divisional zones has a changed symbol ratio greater than or equal to the predetermined value, and all the divisional zones have been selected (YES at S510), the test support device 1 adds order information to the changed symbols at step S511 using the method of image zone dividing described in the second embodiment. When the changed symbol ratios of all the divisional zones are less than the predetermined value, this means that the distribution of the changed symbols is not highly non-uniform in the test screen. Thus, addition of order information in a zigzag manner in a vertical or horizontal direction can reduce eye movement of the tester.

Alternatively, if there is a divisional zone having a high ratio of the changed symbols at step S504 (YES at S504), the test support device 1 adds order information to the changed symbols at step S505 using the clustering method described in the third embodiment. When the changed symbol ratio of a divisional zone is greater than or equal to the predetermined value, this means that the distribution of the changed symbols is non-uniform in the test screen. To address this, a group of pieces of order information is added on a per-cluster basis to thereby reduce tester's eye movement needed for checking symbols.

According to the configuration of the present embodiment, a test image in which order information is added using a more appropriate approach on the basis of the number of the changed symbols included in the post-change image and non-uniformity of the distribution of the changed symbols is output. This allows order information to be added in an optimum order in each post-change image even when different post-change images needing checking are in different situations. This results in a more effective reduction in test burden on the tester and tester's overlooking.

Fifth Embodiment

<Configuration of Test Support System 100>

Figure 14:
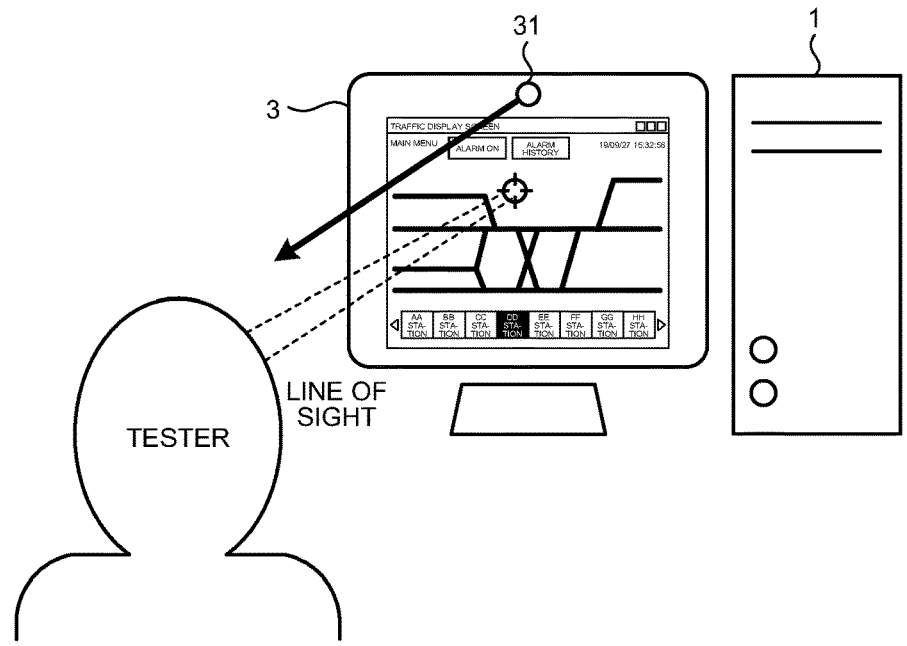
FIG. 14 is a schematic diagram of the test support system according to a fifth embodiment.

A configuration of the test support system 100 according to a fifth embodiment will next be described with reference to FIG. 14. As illustrated in FIG. 14, the output device 3 in the test support system 100 of the fifth embodiment incorporates a camera 31. This camera 31 is provided at a position where the camera 31 can capture an image including the eyes of the tester who is looking at the output device 3. The test support system 100 of the fifth embodiment differs from the test support system 100 according the first, second, third, and fourth embodiments in acquiring a line-of-sight characteristic of the tester from the image captured by the camera 31, and adding order information to the changed symbols on the basis of the acquired line-of-sight characteristic. The configuration and processes other than the configuration of the output device 3 and the order information addition process performed by the test support device 1 are similar to those in the first, second, third, and fourth embodiments.

The camera 31 needs merely to be capable of capturing an image including the eyes of the tester, and examples thereof include a complementary metal-oxide semiconductor (CMOS) camera and a charge-coupled device (CCD) camera. The camera 31 captures an image of the face of the tester at predetermined intervals of, for example, 0.5 seconds or the like, and the storage unit 12 of the test support device 1 stores the images captured by the camera 31. The present embodiment is based on the assumption that the camera 31 is incorporated in the output device 3, but the configuration is not limited thereto. The camera 31 and the output device 3 may be provided separately. In addition, the camera 31 is not limited to a fixed camera, but instead, an image including the eyes of the tester may be obtained using a device in a form of a pair of eyeglasses worn by the tester.

The test support device 1 analyzes the images including the eyes of the tester captured by the camera 31 and obtains a line-of-sight characteristic of the tester. The line-of-sight characteristic of the tester can be obtained by, for example, extracting the pupil area from the images of the tester, and estimating, from the angle of the extracted pupil, a temporal change in the line of sight of the tester. Note that there is no particular limitation on the method of obtaining the line-of-sight characteristic, and the line-of-sight characteristic may be obtained using a publicly known method as appropriate. To obtain the line-of-sight characteristic of the tester, some images out of the multiple test images that are to be actually tested are prepared, or test images having multiple markings thereon are prepared rather than the images that are to be tested, and the tester visually checks, sequentially, the markings on these prepared images displayed.

Examples of line-of-sight characteristic when the tester is viewing a test image will be described with reference to FIG.

Figure 15:
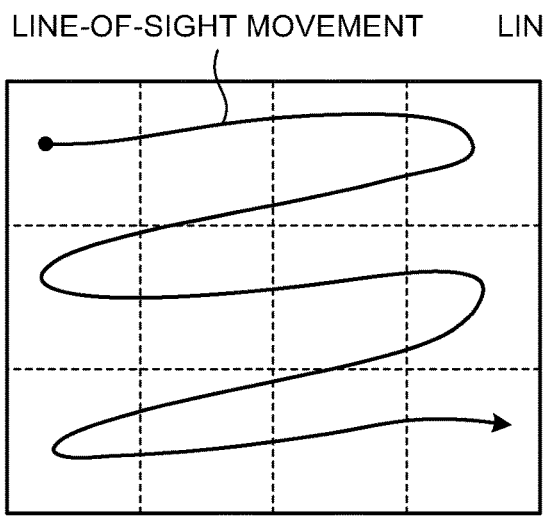
FIG. 15 is a diagram illustrating examples of line of sight of a tester according to the fifth embodiment.
Figure 15:
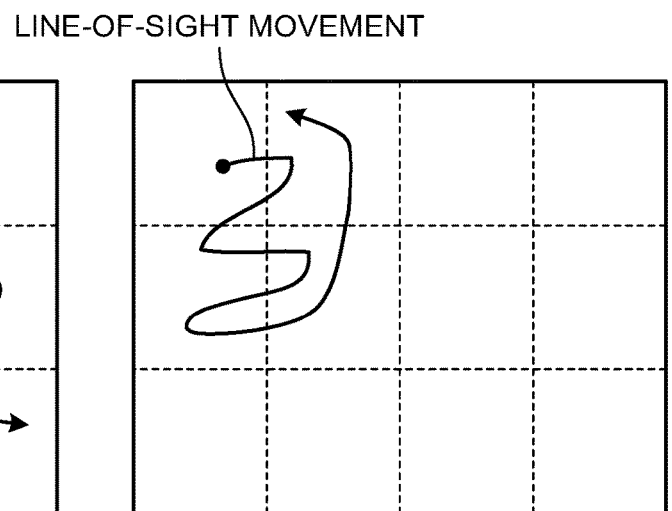

15. FIG. 15(a) illustrates an example of line-of-sight characteristic of a tester. When viewing the test image, this tester moves the line of sight from top left of the screen in the right direction, and after the line of sight reaches the right end, moves the line of sight toward the lower left end, and then in the right direction. It can be seen that this tester has a line-of-sight characteristic of uniformly checking the entire test image by moving the line of sight in this manner.

Meanwhile, FIG. 15(b) illustrates an example of line-of-sight characteristic of another tester. When viewing the test image, this tester moves the line of sight focusing on a specific portion where changed symbols are densely distributed. It can be seen that this tester has a line-of-sight characteristic of checking focusing on a portion where changed symbols are densely distributed rather than viewing the entire test screen.

<Order Information Addition Process of Test Support Device 1>

Figure 16:
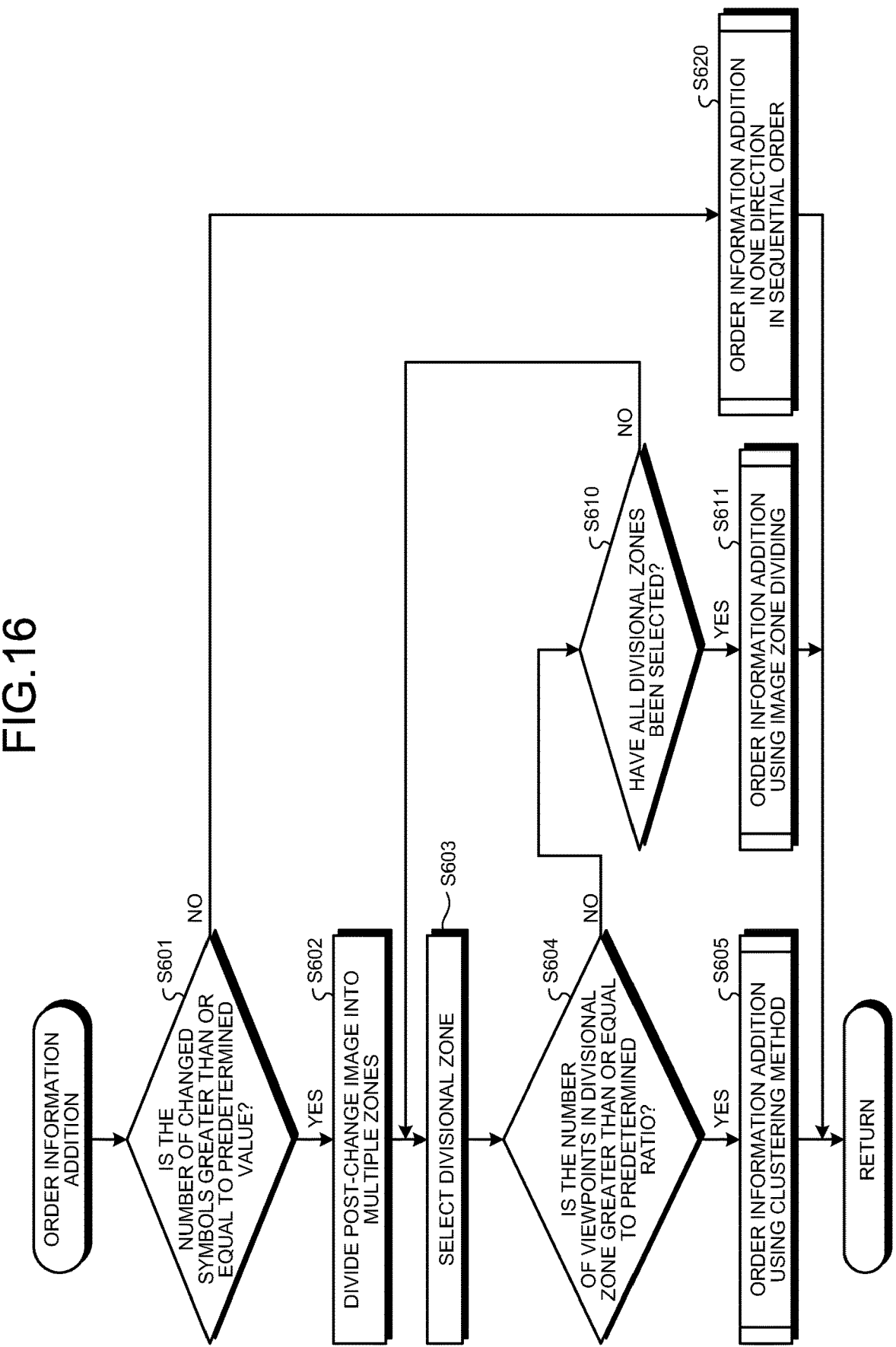
FIG. 16 is a flowchart of an order information addition process performed by the test support device according to the fifth embodiment.

Next, an order information addition process of the test support device 1 based on a line-of-sight characteristic of the tester will be described with reference to FIG. 16. FIG. 16 illustrates a flowchart of an order information addition process performed by the test support device 1. At step S601, the test support device 1 obtains information about the number of changed symbols extracted at step S102, and determines whether the number of changed symbols included in the post-change image is greater than or equal to a predetermined value. In this regard, the predetermined value can be, for example but not limited to, "3", but may be set to a value ranging from 1 to 5 as appropriate.

If the number of changed symbols extracted is less than the predetermined value (NO at S601), the test support device 1 adds order information to the changed symbols at step S620 using the method of adding order information in one direction in a sequential order described in the first embodiment. When the number of changed symbols on the test screen is less than the predetermined number, use of any one of the approaches of adding order information will result in a small variation in distance of movement of the tester's line-of-sight. For this reason, the approach of adding order information in one direction in a sequential order is used to thereby perform an easy and convenience addition of order information.

Alternatively, if the number of changed symbols extracted is greater than or equal to the predetermined value (YES at S601), the test support device 1 divides, at step S602, the post-change image into multiple zones. Specifically, the test support device 1 divides the post-change image equally into four parts along the x-axis direction and equally into three parts along the y-axis direction, that is, divides the post-change image into 12 zones in total. The number of zones resulting from the division of the post-change image is not limited to twelve, and may be set as appropriate on the basis of the size of the screen of the monitoring and control system to be tested, on the size of the changed symbols, on or the like.

Next, at step S603, the test support device 1 selects a division zone in a sequential manner. There is no particular limitation on the order of selection. The division zones can be sequentially selected starting from the top left portion along the x-axis or the y-axis. At step S604, the test support device 1 obtains the number of viewpoints of the tester included in the selected divisional zone, and calculates the ratio of the viewpoints (hereinafter, viewpoint ratio) of the selected divisional zone.

If the viewpoint ratio extracted is less than a predetermined value (NO at S604), the test support device 1 determines, at step S610, whether all the multiple divisional zones resulting from the division of the post-change image at step 602 have been selected. If all the divisional zones have not yet been selected (NO at S610), the test support device 1 selects an unselected divisional zone other than the divisional zones that have already been selected, in a sequential manner, and then determines whether the viewpoint ratio of the selected divisional zone is greater than or equal to the predetermined value.

If none of the divisional zones has a viewpoint ratio greater than or equal to the predetermined value, and all the divisional zones have been selected (YES at S610), the test support device 1 adds order information to the changed symbols at step S611 using the method of image zone dividing described in the second embodiment. When the line-of-sight ratios of all the divisional zones are less than the predetermined value, this means that this tester has a line-of-sight characteristic of uniformly checking the entire test image. Thus, addition of order information in a zigzag manner in a vertical or horizontal direction enables the tester to move the eyes along the order information in an order suitable for the line-of-sight characteristic of the tester.

In this respect, when order information is added to changed symbols using the method of image zone dividing, the direction in which to divide the screen and the order in which to add the order information to the individual zones resulting the division of the post-change image may also be determined on the basis of the obtained tester's line-of-sight information. This enables the tester to move the eyes along the order information in an order further suitable for the line-of-sight characteristic of the tester.

Alternatively, if there is a divisional zone having a high ratio of the changed symbols at step S604 (YES at S604), the test support device 1 adds order information to the changed symbols at step S605 using the clustering method described in the third embodiment. When the changed symbol ratio of a divisional zone is greater than or equal to the predetermined value, this means that this tester has a line-of-sight characteristic of checking focusing on a portion where changed symbols are densely distributed rather than viewing the entire test screen. To address this, a group of pieces of order information is added on a per-cluster basis to thereby allow the tester to move the eyes along the order information in an order suitable for the line-of-sight characteristic of the tester.

According to the configuration of the present embodiment, a test image in which order information is added using a more appropriate method on the basis of the line-of-sight characteristic of the tester is output. This allows order information to be added in an order suitable for the line-of-sight characteristic of that tester even when a large number of test images are to be checked. This results in a more effective reduction in test burden on the tester and the tester's overlooking.

Note that, in the first through fifth embodiments, the test support device 1 automatically selects a suitable order information addition approach, but the selection method is not limited to those described above. Selection of the order information addition approach may be done by the tester. In this case, the test support device 1 generates a test image on the basis of the order information addition approach selected by the tester, and displays the test image on the output device 3.

In addition, the test support device 1 described in the embodiments is merely an example, and combination, modification, and/or omission, as appropriate, of any of the embodiments fall within the scope of technical spirit illustrated in the embodiments.

REFERENCE SIGNS LIST

1 test support device; 2 input device; 3 output device; 10 input unit; 11 processing unit; 12 storage unit; 13 output unit; 20 network; 30 marking; 100 test support system.

The invention claimed is:

1. A test support method comprising:
 obtaining a pre-change image and a post-change image, each to be displayed on a monitoring and control system;
 extracting, from the post-change image, a plurality of symbols that have changed from corresponding symbols in the pre-change image;
 adding order information defined by numerals to the plurality of the extracted symbols within the post-change image consecutively in one direction; and
 outputting a test image in which the order information is added to the plurality of symbols.

2. The test support method according to claim 1, wherein of pieces of the order information added to the plurality of symbols, a last piece of the order information is displayed differently from other pieces of the order information.

3. A test support method comprising:
 obtaining a pre-change image and a post-change image, each to be displayed on a monitoring and control system;
 extracting, from the post-change image, a plurality of symbols that have changed from corresponding symbols in the pre-change image;
 adding order information to the plurality of the extracted symbols; and
 outputting a test image in which the order information is added to the plurality of symbols, wherein the method further comprises:
 grouping the extracted plurality of symbols, into a plurality of groups, wherein
 adding order information includes
adding the order information to symbols belonging to a first group of the plurality of groups, in order corresponding to positions of the individual symbols of the first group, and
 the addition of the order information to the symbols belonging to the first group is followed by adding the order information to symbols belonging to a second group of the plurality of groups, in order corresponding to positions of the individual symbols of the second group.

4. The test support method according to claim 3, further comprising:
 dividing the post-change image into a plurality of zones, wherein
 grouping the plurality of symbols into a plurality of groups includes
 assigning symbols included in a first zone of the plurality of zones to the first group, and
 assigning symbols included in a second zone of the plurality of zones to the second group.

5. The test support method according to claim 4, further comprising:
 obtaining the number of the symbols in the post-change image, the symbols being symbols having changed from corresponding symbols in the pre-change image, wherein the post-change image is divided into the plurality of zones when the obtained number of the symbols is greater than or equal to a predetermined number.

6. The test support method according to claim 4, further comprising:
 obtaining the number of the symbols in the post-change image, the symbols being symbols having changed from corresponding symbols in the pre-change image, wherein
the number of the zones into which the post-change image is divided varies on the basis of the obtained number of the symbols.

7. The test support method according to claim 3, wherein grouping the plurality of symbols into a plurality of groups includes grouping the plurality of symbols into the plurality of groups using a clustering method.

8. The test support method according to claim 7, wherein the clustering method is k-means clustering.

9. The test support method according to claim 7, further comprising:
 dividing the post-change image into a plurality of zones; and
 obtaining the number of symbols included in each of the plurality of zones resulting from the division of the post-change image, the symbols being symbols having changed from corresponding symbols in the pre-change image, wherein
 grouping the plurality of symbols into a plurality of groups includes grouping the plurality of symbols into the plurality of groups using the clustering method when the number of the symbols having changed from corresponding symbols in the pre-change image is greater than a predetermined ratio.

10. The test support method according to claim 3, further comprising:
 obtaining a line-of-sight characteristic of a testing person, wherein a manner of grouping the plurality of symbols into the first group and the second group varies on the basis of the obtained line-of-sight characteristic.

11. A test support device comprising:
 an input interface to obtain a pre-change image and a post-change image, each to be displayed on a monitoring and control system;
 a processor to execute a program;
 a memory to store the program that, when executed by the processor, performs a process of extracting, from the post-change image, a plurality of symbols that have changed from corresponding symbols in the pre-change image, and adding order information defined by numerals to the extracted plurality of symbols within the post-change image consecutively in one direction; and
 an output interface to output a test image in which the order information is added to the plurality of symbols.

12. A non-transitory storage medium storing a test support program causing a computer to perform:
 obtaining a pre-change image and a post-change image, each to be displayed on a monitoring and control system;
 extracting, from the post-change image, a plurality of symbols that have changed from corresponding symbols in the pre-change image;
 adding order information defined by numerals to the extracted plurality of symbols within the post-change image consecutively in one direction; and
 outputting a test image in which the order information is added to the plurality of symbols.

13. A test support device comprising:
an input interface to obtain a pre-change image and a post-change image, each to be displayed on a monitoring and control system;
a processor to execute a program;
a memory to store the program that, when executed by the processor, performs a process of extracting, from the post-change image, a plurality of symbols that have changed from corresponding symbols in the pre-change image, and adding order information to the extracted plurality of symbols and grouping the extracted plurality of symbols, into a plurality of groups, wherein the adding order information includes:
adding the order information to symbols belonging to a first group of the plurality of groups, in order corresponding to positions of the individual symbols of the first group, and
the addition of the order information to the symbols belonging to the first group is followed by adding the order information to symbols belonging to a second group of the plurality of groups, in order corresponding to positions of the individual symbols of the second group; and
an output interface to output a test image in which the order information is added to the plurality of symbols.

14. The test support device according to claim 13, wherein of pieces of the order information added to the plurality of symbols, a last piece of the order information is displayed differently from other pieces of the order information.

15. A non-transitory storage medium storing a test support program causing a computer to perform:
obtaining a pre-change image and a post-change image, each to be displayed on a monitoring and control system;
extracting, from the post-change image, a plurality of symbols that have changed from corresponding symbols in the pre-change image;
adding order information to the extracted plurality of symbols;
grouping the extracted plurality of symbols, into a plurality of groups, wherein the adding order information includes
adding the order information to symbols belonging to a first group of the plurality of groups, in order corresponding to positions of the individual symbols of the first group, and
the addition of the order information to the symbols belonging to the first group is followed by adding the order information to symbols belonging to a second group of the plurality of groups, in order corresponding to positions of the individual symbols of the second group; and
outputting a test image in which the order information is added to the plurality of symbols.

16. The non-transitory storage medium according to claim 15, wherein
of pieces of the order information added to the plurality of symbols, a last piece of the order information is displayed differently from other pieces of the order information.

* * * * *